(12) United States Patent
Yoo et al.

(10) Patent No.: US 8,659,695 B2
(45) Date of Patent: Feb. 25, 2014

(54) METHOD OF CONTROLLING DIGITAL IMAGE PROCESSING APPARATUS, MEDIUM FOR RECORDING THE METHOD, AND DIGITAL IMAGE PROCESSING APPARATUS OPERATING ACCORDING TO THE METHOD (75) Inventors: Jeoung-gon Yoo, Suwon-si (KR); Sung-ho Eun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 821 days.

(21) Appl. No.: 12/536,585

(22) Filed: Aug. 6, 2009

(65) Prior Publication Data
US 2010/0033614 A1    Feb. 11, 2010

(30) Foreign Application Priority Data
Aug. 6, 2008    (KR) .................. 10-2008-0077050

(51) Int. Cl.
*H04N 5/222*    (2006.01)

(52) U.S. Cl.
USPC ....................................... 348/333.02

(58) Field of Classification Search
None
See application file for complete search history.

(56) References Cited

U.S. PATENT DOCUMENTS

| | | | |
|---|---|---|---|
| 6,900,835 B2 * | 5/2005 | Cazier et al. .............. | 348/231.2 |
| 7,265,786 B2 * | 9/2007 | Venturino et al. ....... | 348/333.02 |
| 7,652,694 B2 * | 1/2010 | Suto .............................. | 348/239 |
| 2007/0211158 A1 * | 9/2007 | Icho ........................ | 348/333.02 |

\* cited by examiner

*Primary Examiner* — Luong T Nguyen
(74) *Attorney, Agent, or Firm* — Drinker Biddle & Reath LLP (57) ABSTRACT Provided are a method of controlling a digital image processing apparatus, and a digital image processing apparatus operating according to the method. The method includes receiving a menu content selection signal, generating meta data corresponding to the menu content selection signal, selecting menu content corresponding to the meta data, and displaying the selected menu content.

10 Claims, 5 Drawing Sheets

METHOD OF CONTROLLING DIGITAL IMAGE PROCESSING APPARATUS, MEDIUM FOR RECORDING THE METHOD, AND DIGITAL IMAGE PROCESSING APPARATUS OPERATING ACCORDING TO THE METHOD

CROSS-REFERENCE TO RELATED PATENT APPLICATION

This application claims the benefit of Korean Patent Application No. 10-2008-0077050, filed on Aug. 6, 2008, in the Korean Intellectual Property Office, the disclosure of which is incorporated herein in its entirety by reference.

BACKGROUND

The present invention relates to a method of controlling a digital image processing apparatus that supports various modes, and a digital image processing apparatus operating according to the method.

Digital image processing apparatuses supporting various shooting modes, e.g., a face recognition mode, a night-view mode, and a close-up mode, have been developed. In addition, digital image processing apparatuses further having various functions, e.g., personal digital assistant (PDA) functions and MPEG1 Layer 3 (MP3) functions, are also known In a digital image processing apparatus supporting various functions, each of the functions is executed by selecting a mode corresponding thereto. In this case, a plurality of user interfaces (UIs) for controlling the functions that are to be executed, are displayed. However, the UIs are displayed in a manner in which a manufacturer initially stored them. Furthermore, menu content, such as a background image, is displayed as a default, and is not based on demands or convenience of users.

SUMMARY

The present invention provides a method of controlling a digital image processing apparatus capable of applying various menu content based on the demands or convenience of a user, and a digital image processing apparatus operating according to the method.

According to an aspect of the present invention, there is provided a method of controlling a digital image processing apparatus, the method including receiving a menu content selection signal; generating meta data corresponding to the menu content selection signal; selecting menu content corresponding to the meta data; and displaying the selected menu content.

The menu content corresponding to the meta data may be selected from among a plurality of items of menu content being categorized according to an age group to which a user belongs. A first menu content selection signal may be input when the user belongs to a 10-20 age group, a second menu content selection signal may be input when the user belongs to a 30-40 age group, and a third menu content selection signal may be input when the user belongs to an age group of 50 or more.

According to another aspect of the present invention, there is provided a computer readable recording medium having recorded thereon a program for executing the above method in a digital apparatus.

According to another aspect of the present invention, there is provided a digital image processing apparatus including a user interface via which a menu content selection signal is input; a meta data generation unit generating meta data corresponding to the menu content selection signal; a menu content selection unit selecting menu content corresponding to the meta data; and a display unit displaying the selected menu content.

The menu content corresponding to the meta data may be stored in the storage unit. A plurality of items of menu content may be stored in the storage unit.

The menu content selection signal may be categorized according to an age group to which the user belongs, and the items of menu content may also be categorized according to an age group to which the user belongs.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

An embodiment of a digital image processing apparatus according to the present invention will be described in detail with reference to FIGS. 1 and 2. In the current embodiment, a digital camera is exemplified as a digital image processing apparatus.

Figure 1:
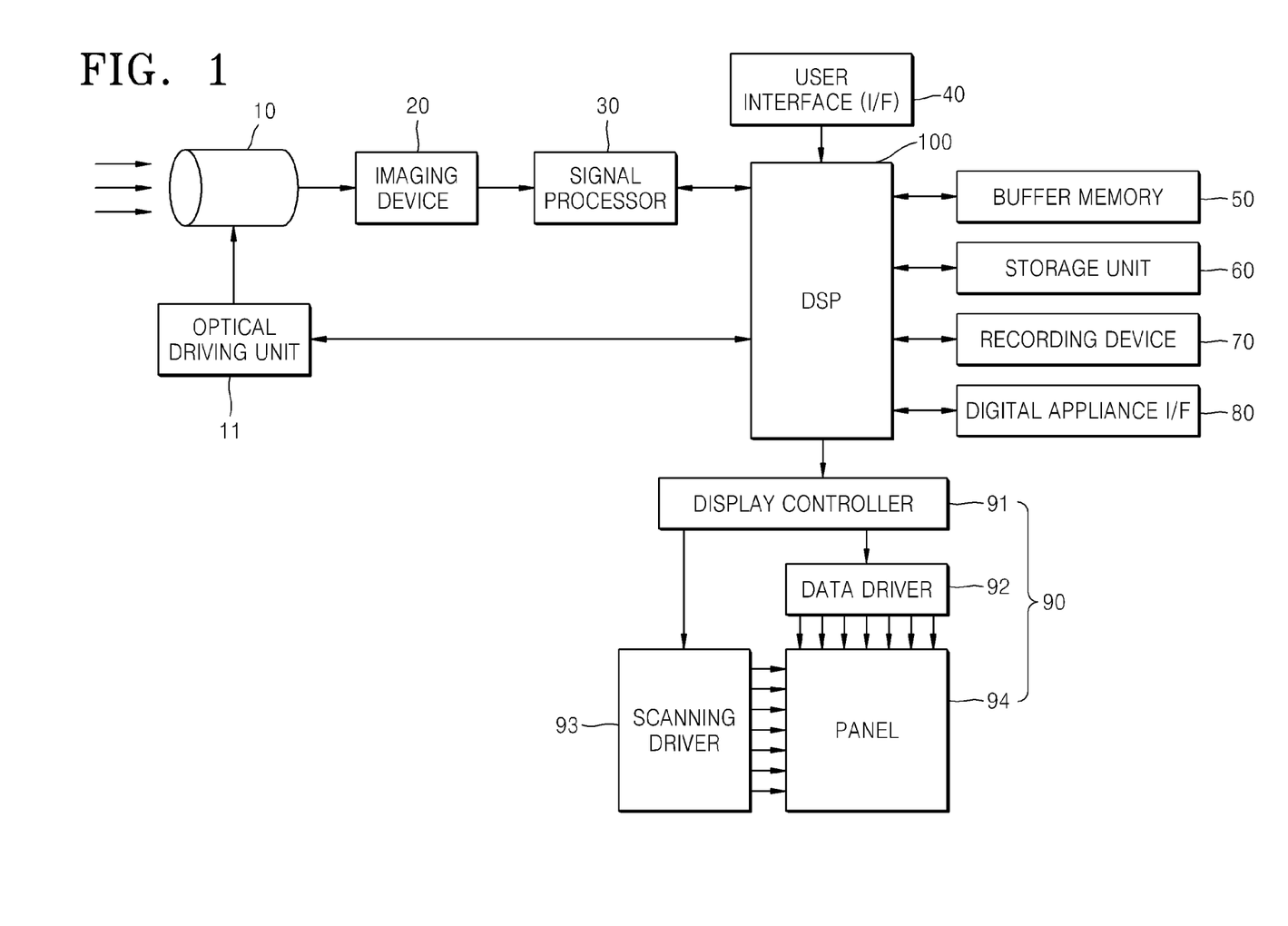
FIG. 1 is a block diagram of a digital image processing apparatus according to an embodiment of the present invention.

Referring to FIG. 1, the digital camera includes an optical unit 10, an optical driving unit 11, an imaging device 20, a signal processor 30, a user interface 40, a buffer memory 50, a storage unit 60, a recording device 70, a digital appliance interface (I/F) 80, a display unit 90 and a digital signal processor (DSP) 100.

In detail, although not shown in the drawings, the optical unit 10 may include a lens focusing an optical signal, a diaphragm controlling the amount of light of the optical signal, a shutter controlling input of the optical signal, and so on.

The lens includes a zoom lens that increases or reduces a viewing angle according to a focal length, and a focus lens that brings a subject into focus. These lenses may be manufactured to be separated from each other but may be manufactured to form an array of lenses together.

The shutter may not only protect the imaging device 20 from light but also close and open to control the amount of exposure of the imaging device 20 to light. An amount of time during which the shutter opens is referred to as shutter speed, which is closely related to exposure of the imaging device 20. Examples of the shutter include a lens shutter, a focal plane shutter, a Thornton shutter, a light value shutter, etc.

The diaphragm is an aperture formed using five or six thin metal wings. In the diaphragm, driving of the metal wings is controlled to adjust the amount of light to pass through the diaphragm. The amount of light to pass through the diaphragm varies according to the size of the aperture, and thus, the amount of light corresponding to the size of the diaphragm may be calculated by measuring the area of the aperture.

The optical unit 10 is driven by the optical driving unit 11. The optical driving unit 11 controls the location of the lens, opening and closing of the diaphragm, the operation of the shutter, and so on. It is possible to focus the subject by adjusting the location of the lens, and control the amount of light by opening or closing the diaphragm or the shutter.

The optical signal passing through the optical unit 11 is formed as an image of the subject on a light receiving surface of the imaging device 20. The imaging device 20 is a photoelectric conversion unit that converts an optical signal into an electrical signal. The imaging device 20 may be a charge-coupled device (CCD) or a complementary metal oxide semiconductor image sensor (CIS). The imaging device 20 includes a pair of a vertical transmission channel and a horizontal transmission channel, and a plurality of pairs of pixels in the form of a square or rectangular checkerboard. The pixels convert light received via the optical unit 11 into electric charges, and thus, information regarding a subject may be obtained by collecting information regarding the pixels according to the amount of the electric charges. In the case of an electronic digital camera, it is possible to control capturing of an image of the subject by discontinuing the supply of power to the imaging device 20, instead of using the shutter.

The signal processor 30 removes noise from an analog electrical signal received from the imaging device 20 through correlate double sampling (CDS), controls the analog electric signal to have a constant luminance level regardless of a change in the amount of light through automatic gain controlling (AGC), and then, converts the automatic gain controlled analog electric signal into a digital signal by using a analog-to-digital converter (ADC) (not shown). The signal processor 30 converts an analog image signal received from the imaging device 20 into a digital image signal and then outputs the digital image signal to the DSP 100.

It is possible to receive a control signal from the outside, e.g., a user, via the user interface 40. Although not shown, the user interface 40 includes various function buttons, e.g., a release button for exposing the imaging device 20 to light for a predetermined time in order to generate a shutter-release signal for capturing an image, a power button for generating a control signal for supplying power, a wide angle-zoom button for widening a viewing angle, a telephoto-zoom button for narrowing a viewing angle, a mode selection button for inputting characters or selecting a shooting mode or a play mode, a button for white balancing, a button for setting exposure, and so on. The user interface 40 may include various embodiments, such as a keyboard, a touch pad, a touch screen, or a remote controller, via which user input can be received.

In the current embodiment, a menu content selection signal may be input via the user interface 40. That is, the menu content selection signal may be input to select desired menu content from among a plurality of items of menu content, via the user interface 40. A user him/herself may select one item of menu content from among the plurality of items of menu content but information regarding the user, which is related to menu content that the user desires, may be input in order to select the desired menu content. For example, an age group to which the user belongs may be input or selected in order to select menu content corresponding to the age group.

The buffer memory 50 may temporarily store an image signal received via the optical unit 10, the imaging device 20 and the signal processor 30. The buffer memory 50 may be implemented as synchronous dynamic random access memory (SDRAM).

The storage unit 60 stores a program for running the digital camera. The storage unit 60 may be implemented as flash memory. In the current embodiment, the storage unit 60 stores a plurality of items of menu content, and a program allowing a user to select desired menu content from among the items of menu content.

An image file obtained by compressing the image signal is recorded on the recording device 70. For example, a still image file or a moving picture file obtained using a compression method, such as JPEG or MPEG, may be recorded on the recording device 70. The recording device 70 may be a compact flash (CF) card, a Smartmedia card, Mimiature, a memory stick, a Microdrive, or an I/O click.

The digital camera may be connected to a mobile communication device, such as a mobile phone and a personal digital assistant (PDA), or an external digital device, such as a personal computer (PC), a computer server, and a display device. In this case, desired information is transmitted via the digital appliance I/F 80. The digital appliance I/F 80 communicates with a digital device, and may be embodied as a universal serial bus (USB), RS-232, or IEEE 1394.

The display unit 90 displays an operating state of the digital camera or an image captured by the digital camera. The display unit 90 may include a display controller 91, a data driver 92, a scanning driver 93, and a panel 94. The display controller 91 converts image data received from the DSP 100 according to a display method that the panel 94 employs, and outputs the converted image data to the data driver 92 and the scanning driver 93. The data driver 92 provides a data signal to the panel 94, and the scanning driver 93 provides a scanning signal to the panel 94. The panel 94 displays an image according to the data signal and the scanning signal. The panel 94 may be embodied as a liquid crystal display (LCD), an organic light emitting diode (OLED), or an electrophoretic digital display (EDD).

In the current embodiment, the display unit 90 may display a user interface (UI) via which a user inputs a control signal in order to select desired menu content, a UI corresponding to the user's information corresponding to the desired menu content, and the items of menu content. For example, the display unit 90 may display a first UI of a customized menu, via which the user inputs a control signal in order to select the desired menu content. If the user selects the first UI, the display unit 90 may display a second UI via which an age group to which the user belongs is selected and input. If the age group to which the user belongs is selected using the second UI, menu content corresponding to the selected age group may be displayed.

The digital camera includes the DSP 100 that performs predetermined signal processing in order to improve the quality of input image data and controls the overall operations of the digital camera. In the current embodiment, the DSP 100 controls desired menu content to be selected and displayed.

The DSP 100 will now be described in detail with reference to FIG. 2.

Figure 2:
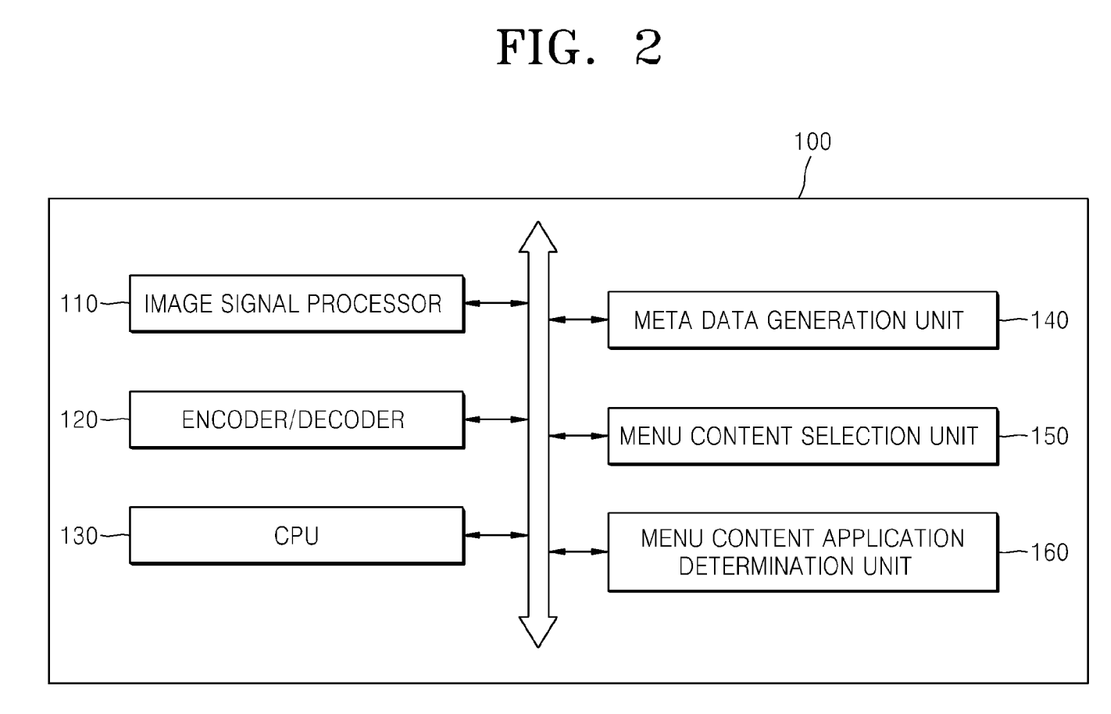
FIG. 2 is a block diagram of a digital signal processor included in the digital image processing apparatus of FIG. 1, according to an embodiment of the present invention.

Referring to FIG. 2, the DSP 100 includes an image signal processor 110, an encoder/decoder 120, and a central processing unit (CPU) 130. The image signal processor 110 performs image signal processing, such as gamma correction, color filter array interpolation, color matrix, color correction, and color enhancement, in order to convert image data according to the human perspective of vision.

The encoder/decoder 120 compresses image data that has been signal-processed in order to generate an image file that is to be stored in the recording device 70. The encoder/decoder 120 also reconstructs the image data from the image file, and the reconstructed image data is displayed as a predetermined image on the display unit 90.

The CPU 130 includes an arithmetic unit, a register, and a controller. The CPU 130 performs an arithmetic operation according to a program stored in the CPU 130, temporarily stores information for the arithmetic operation or the result of performing the arithmetic operation in the register, and allows the controller to control the operations of the elements of the digital camera according to the result of performing the arithmetic operation. For example, the CPU 130 corrects exposure of received image data according to the stored program, determines whether a focal point is moved, and outputs a control signal for driving the optical driving unit 11 according to the determination result. Also, although not shown in the drawings, the CPU 130 may control the signal processor 30 to perform AGC according to the stored program, control a timing signal to be transmitted to the imaging device 20 and the signal processor 30, and control the overall operations of the elements of the digital camera.

Also, the DSP 100 includes a meta data generation unit 140, a menu content selection unit 150, and a menu content application determination unit 160 in order for a user to select and apply desired menu content.

If a user inputs the menu content selection signal via the user interface 40, the meta data generation unit 140 generates meta data corresponding to the menu content selection signal. The menu content selection unit 150 selects menu content corresponding to the meta data. Examples of menu content of the digital camera may be a menu screen, a UI, an image display method, and so on. In the image display method, a picture frame screen for decorating or presenting an image may be used. The menu content selected by the menu content selection unit 150 may be directly displayed on the display unit 90, but the menu content application determination unit 160 may determine whether to apply the selected menu content in order to prevent inconvenience caused when menu content should be selected and applied again when the user mistakenly selects and applies undesired menu content. For example, if the user checks selected menu content through a preview function and inputs a control signal for applying the selected menu content via the user interface 40, the menu content application determination unit 160 may control the selected menu content to be displayed. If the user inputs a control signal not for applying the selected menu content via the user interface 40, the unit waits for input of another menu content selection signal.

A method of controlling a digital image processing apparatus, e.g., a digital camera, according to an embodiment of the present invention will now be described with reference to FIG. 3.

Figure 3:
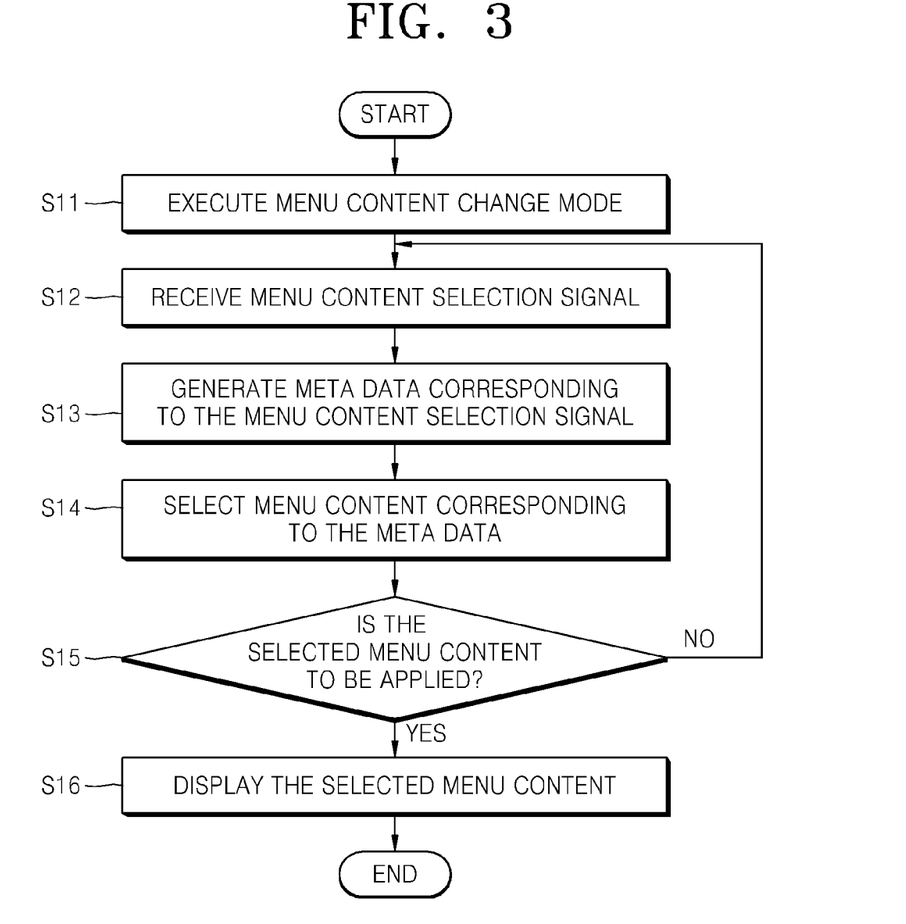
FIG. 3 is a flowchart illustrating a method of controlling a digital image processing apparatus according to an embodiment of the present invention.

Referring to FIG. 3, first, a menu content change mode is executed (operation S11).

A menu content selection signal is received in order to select desired menu content from among a plurality of items of menu content (operation S12). A user may select desired menu content by him/herself from among the items of menu content, but information regarding the user, which corresponds to the desired menu content, may be input in order to select the desired menu content. The user's age or an age group to which the user belongs may be input as the information regarding the user.

Meta data corresponding to the menu content selection signal is generated (operation S13). If the user's age or the age group to which to the user belongs is input, meta data corresponding to the age or age group is generated.

Next, menu content corresponding to the meta data is selected from among the items of menu content (operation S14).

It is determined whether to apply the selected menu content (operation S15).

If it is determined that the selected menu content is not to be applied, the unit waits for input of another menu content selection signal. Otherwise, if it is determined that the selected menu content is to be applied, the selected menu content is displayed (operation S16).

For example, a screen inquiring whether to apply the selected menu content is displayed, and the selected menu content is applied and displayed when a user inputs a control signal for applying the selected menu content. Otherwise, the unit waits for input of another menu content selection signal when the user inputs a control signal not for applying the selected menu content.

An embodiment of the present invention is also a computer readable recording medium having recorded thereon a program for executing the method. The computer readable recording medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable recording medium may be a carrier wave that transmits data via the Internet, for example. The computer readable recording medium can be distributed among computer systems that are interconnected through a network, and the present invention may be stored and implemented as computer readable code in the distributed system.

An operating screen of a digital camera that operates according to the above method of controlling a digital image processing apparatus according to an embodiment of the present invention will be described with reference to FIGS. 4 to 7.

Figure 4:
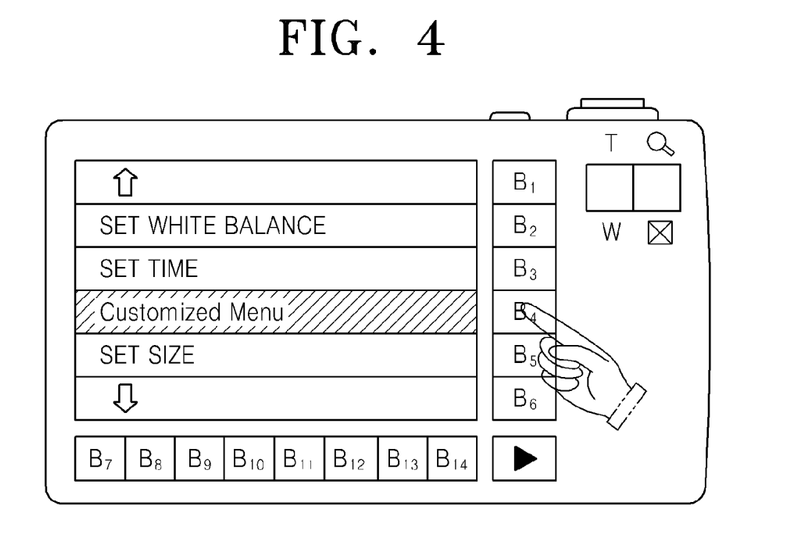
FIGS. 4 through 7 are pictorial diagrams illustrating an operating screen of a digital camera that operates according to the method of FIG. 3, according to an embodiment of the present invention.

FIG. 4 illustrates a setting mode screen of the digital camera, via which a setting mode is selected and applied from among various setting modes, e.g., a white balance setting mode for setting white balancing, a time setting mode for setting time, a customized menu for allowing a user to set desired menu content, and a size setting mode for setting size of an image. As illustrated in FIG. 4, the customized menu may be selected in the setting mode screen. For example, horizontal lines may be selected using buttons B1 through B6, and vertical lines may be selected using buttons B7 through B14. If a user inputs a selection signal by manipulating the button B3, the customized menu allowing the user to select menu content may be selected.

Figure 5:
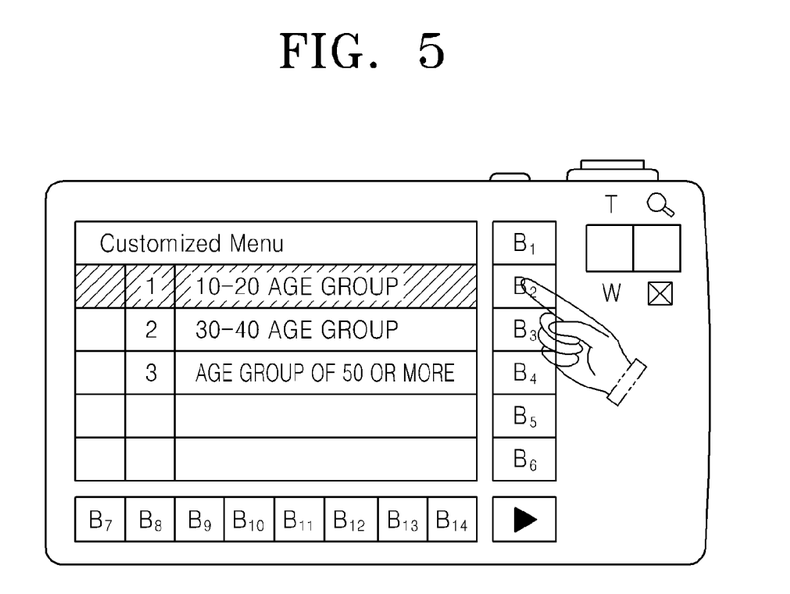

As illustrated in FIG. 5, if the customized menu is selected, a screen, via which information of the user may be input may be displayed. In detail, a screen via which the user's age may be input may be displayed. The user may input a selection signal by manipulating the button B2 when the user's age belongs to the 10-20 age group, manipulating the button B3 when the user's age belongs to the 30-40 age group, and manipulating the button B4 when the user's age belongs to an age group of 50 or more.

If the user selects the 10-20 age group by manipulating the button B2, first meta data corresponding to the 10-20 age group may be generated, and first menu content corresponding to the first meta data may be selected. If the user's age belongs to the 10-20 age group, the first menu content having a decorative background image and graphic UIs may be applied. If the user selects the 30-40 age group by manipulating the button B5, second meta data corresponding to the 30-40 age group may be generated and second menu content corresponding to the second meta data may be selected. The second menu content may be simpler and have larger characters than the first menu content, in consideration of the user belonging to the 30-40 age group.

Figure 6:
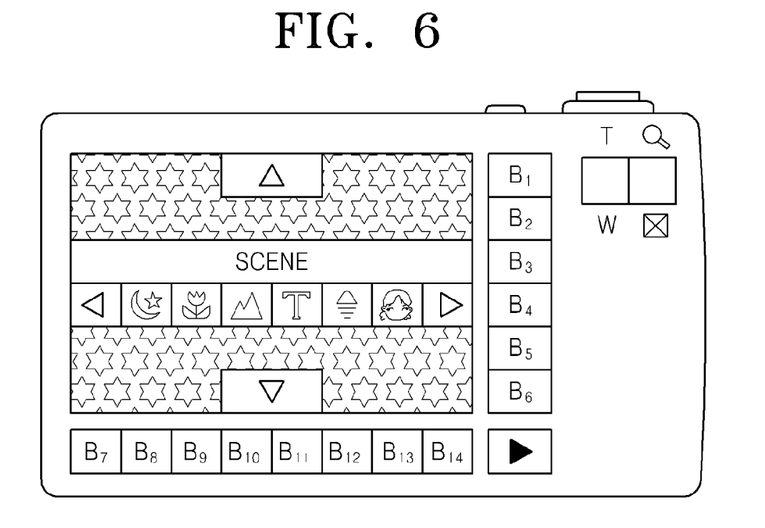
Figure 7:
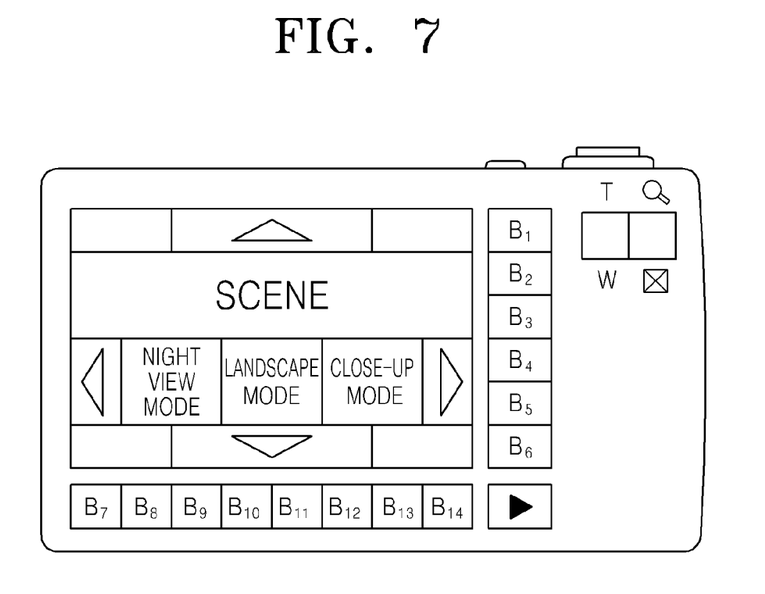

For example, FIG. 6 illustrates the first menu content for the 10-20 age group, and FIG. 7 illustrates the second menu content for the 30-40 age group. Referring to FIG. 6, a decorative pattern is illustrated as a background image, and a UI for setting a night-view mode, a close-up mode, a landscape mode, and a portrait mode is displayed graphically. Referring to FIG. 7, a background image is simple, a UI for setting the above modes is displayed in characters rather than graphically so that these modes can be easily identified, and the size of the characters may be adjusted to be large. Furthermore, the UI may be displayed to be large so that an image may be captured in the night view mode by manipulating only at least one of the buttons B8 and B9.

Accordingly, it is possible to easily manipulate and operate a digital camera according to a user's characteristics.

Various embodiments of the present invention provides a method of controlling a digital image processing apparatus capable of applying and displaying menu content according to a user's characteristics, e.g., the user's age or an age group to which the user belongs, and a digital image processing apparatus operating according to the method. Accordingly, it is possible to increase the user's satisfaction and convenience by applying menu content that the user desires or that matches the user.

The software modules used to implement these embodiments may be stored as program instructions or computer readable codes executable on the processor on a computer-readable media such as read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. This media can be read by the computer, stored in the memory, and executed by the processor.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Furthermore, the present invention could employ any number of conventional techniques for electronics configuration, signal processing and/or control, data processing and the like.

The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. Numerous modifications and adaptations will be readily apparent to those skilled in this art without departing from the spirit and scope of the present invention.

What is claimed is:

1. A method of controlling a digital image processing apparatus, the method comprising:
receiving a menu content display style selection signal according to an age group to which a user belongs;
generating meta data corresponding to the menu content display style selection signal;
selecting a menu content display style corresponding to the meta data; and
displaying a menu content in the menu content display style selected according to the age group to which the user belongs.

2. The method of claim 1, wherein the menu content display style corresponding to the meta data is selected from among a plurality of menu content display styles categorized according to the age group to which the user belongs.

3. The method of claim 2, wherein the plurality of menu content display styles comprise:
a first menu content display style for a first age group; and
a second menu content display style for an age group which is younger than the first age group.

4. The method of claim 3, wherein the first menu content display style comprises a first character font, and the second menu content display style comprises a second character font which is smaller than the first character font.

5. The method of claim 3, wherein the first menu content display style comprises a smaller number of colors or figures than the second menu content display style.

6. A non-transitory computer readable recording medium having recorded thereon a program for executing a method of controlling a digital image processing apparatus, the method comprising:

receiving a menu content display style selection signal according to an age group to which a user belongs;

generating meta data corresponding to the menu content display style selection signal;

selecting a menu content display style corresponding to the meta data; and displaying a menu content in the menu content display style selected according to the age group to which the user belongs.

7. A digital image processing apparatus comprising:

a user interface via which a menu content display style selection signal according to an age group to which a user belongs is to be input;

a meta data generation unit to generate meta data corresponding to the menu content display style selection signal;

a menu content selection unit to select a menu content display style corresponding to the meta data; and a display unit to display a menu content in the menu content display style selected according to the age group to which the user belongs.

8. The apparatus of claim 7, further comprising a storage unit to store a plurality of menu content display styles.

9. The apparatus of claim 8, wherein:

the plurality of menu content display styles are categorized according to the age group to which the user belongs.

10. The method of claim 1, wherein the meta data is differently generated according to the received menu content display style selection signal, and the menu content display style is determined by the generated meta data.

\* \* \* \* \*